(12) United States Patent
Wynne et al.

(10) Patent No.: US 6,959,002 B2
(45) Date of Patent: Oct. 25, 2005

(54) TRAFFIC MANAGER FOR NETWORK SWITCH PORT

(75) Inventors: John M. Wynne, Sunnyvale, CA (US);
David L. Dooley, San Jose, CA (US);
Robert J. Divivier, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 992 days.

(21) Appl. No.: 09/908,614

(22) Filed: Jul. 18, 2001

(65) Prior Publication Data

US 2003/0016686 A1 Jan. 23, 2003

Related U.S. Application Data

(63) Continuation-in-part of application No. 09/847,078, filed on May 1, 2001, now Pat. No. 6,687,781.

(51) Int. Cl.[7] .................. H04L 12/28; H04L 12/54; H04L 12/56
(52) U.S. Cl. .................. 370/412; 370/389; 370/429
(58) Field of Search .............. 370/395.21, 395.43, 370/412, 413, 429, 389, 428

(56) References Cited

U.S. PATENT DOCUMENTS

| | | | | |
|---|---|---|---|---|
| 6,091,708 A | * | 7/2000 | Matsunuma | 370/233 |
| 6,292,492 B1 | * | 9/2001 | Bonomi et al. | 370/415 |
| 6,414,963 B1 | * | 7/2002 | Gemar | 370/412 |
| 2002/0044546 A1 | * | 4/2002 | Magill et al. | 370/352 |

* cited by examiner

Primary Examiner—Kenneth Vanderpuye
Assistant Examiner—Feben Haile
(74) Attorney, Agent, or Firm—Daniel J. Bedell; Smith-Hill and Bedell

(57) ABSTRACT

A traffic manager for a network switch input or output port stores incoming cells in a cell memory and later sends each cell out of its cell memory toward one of a set of forwarding resources such as, for example, another switch port or an output bus. Data in each cell references the particular forwarding resource to receive the cell. Each cell is assigned to one of several flow queues such that all cells assigned to the same flow queue are to be sent to the same forwarding resource. The traffic manager maintains a separate virtual output queue (VOQ) associated with each forwarding resource and periodically loads a flow queue (FQ) number identifying each flow queue into the VOQ associated with the forwarding resource that is to receive the cells assigned to that FQ. The traffic manager also periodically shifts an FQ ID out of each non-empty VOQ and forwards the longest-stored cell assigned to that FQ from the cell memory toward its intended forwarding resource. The traffic manager separately determines the rates at which it loads FQ IDs into VOQs and the rates at which it shifts FQ IDs out of each non-empty VOQ. Thus the traffic manager is able to separately control the rate at which cells of each flow queue are forwarded and the rate at which each forwarding resource receives cells.

20 Claims, 7 Drawing Sheets

TRAFFIC MANAGER FOR NETWORK SWITCH PORT

CROSS-REFERENCE TO RELATED APPLICATION

Figure 1:
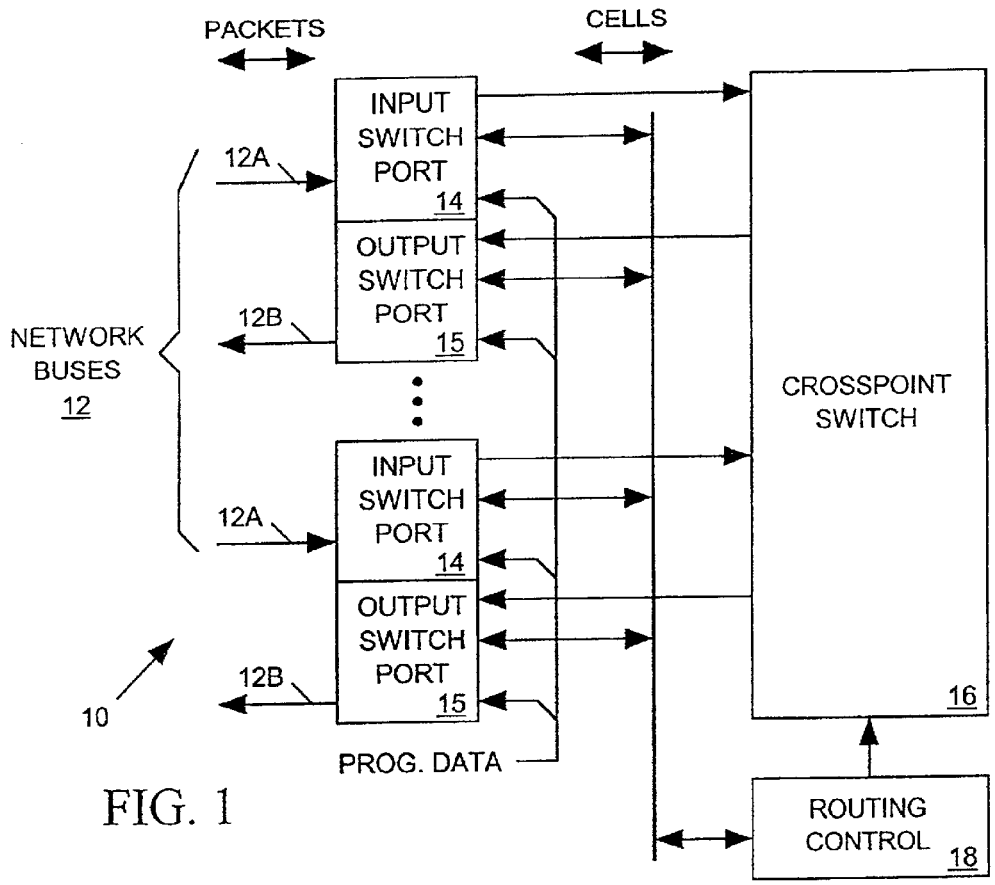

This application is filed as a continuation-in-part of U.S. patent application Ser. No. 09/847,078 filed May 1, 200 now U.S. Pat. No. 6,687,781.

BACKGROUND OF THE INVENTION

1. Field of the Invention

The present invention relates in general to a network switch for routing traffic between network buses, and in particular to a traffic manager for controlling rates at which an input or output port of the network switch forwards traffic into or away from the network switch.

2. Description of Related Art

A network switch routes data transmissions such as ethernet packets between a set of network buses. A typical network switch includes a set of input ports for receiving network traffic arriving on input buses, a set of output ports for forwarding traffic outward on output buses, and a switch fabric such as a crosspoint switch for routing traffic between the input and output ports.

Network traffic often travels over buses in the form of packets, each including a variable data payload that a source computer sends to a destination computer. Each packet also includes a header conveying data the network devices need to properly route and process the packet. A network switch input port may include a protocol processor for converting each incoming packet to a sequence of cells of uniform size, and a "traffic manager" within the input port for storing the cells in a cell memory until it can forward them through the switch fabric to one of the output ports. An output switch port may include a traffic manager for storing the cells received via the switch fabric in its buffer memory and for later forwarding them to another protocol processor. The output port's protocol processor reassembles each cell into a packet and forwards the packet outward on a network bus.

Each packet is assigned to one of a set of "flows". All packets assigned to the same flow pass between the same source and destination station and have the same class of service. A flow's "class of service" defines, for example, the maximum and minimum rates at which the network switch forwards traffic assigned to the flow and the forwarding priority the network switch gives to the flow's packets relative to packets of other flows. The traffic manager in a network switch forwards packets of the same flow in the order that it receives them, but may forward packets of high priority flows before forwarding earlier received packets of low priority flows. A flow's maximum and minimum forwarding rate may be established by contractual agreement. For example a network service provider owning a network switch and a network user operating a network station connected to the network switch may agree that packet flows through the switch going to or from that network station will be restricted to specified minimum and maximum rates.

Each packet includes a flow identification number (FIN) in its header identifying the packet's flow. The traffic manager of a network switch input port receiving the incoming packet decodes the packet's FIN to determine which output port is to receive and forward the packet toward the destination station and to determine the rate and priority with which it forwards a packet's cells to an output port. A network switch output port may be able to forward a packet outward to another network switch or to a network station on a selected channel of any of several different network buses, and the traffic manager of a network switch output port decodes the packet's FIN to determine which output bus or bus channel is to convey the packet away from the port. The output port's traffic manager may also decode a packet's FIN to determine a packet's minimum and maximum forwarding rate and priority.

The rate at which an output port forwards packets over a given bus or bus channel is often subject to contractual limits. Hence in addition to controlling forwarding rates and priorities of the various flows to satisfy contractual agreements, the traffic manager of an output switch port may also have to control the rate at which it forwards packets over each output bus channel it accesses so that it remains within contractual limits.

Thus a traffic manager may have to perform two kinds of rate control. First, it must control the rate at which it forwards packets or cells of each flow to maintain the flow rate between desired maximum and minimum limits. Secondly, a traffic manager may have to control the rate at which it forwards packets outward on a particular bus, or each bus channel, irrespective of the flows to which those packets are assigned.

A typical traffic manager first allocates its forwarding bandwidth among its various output resources (such as output busses or bus channels) to make sure that each output resource has sufficient bandwidth to accommodate the flows that make use of that output resource and, conversely, to make sure that the bandwidth allocated to an output resource does not exceed the output resource's contractual or physical bandwidth limitations. The traffic manager then suballocates the bandwidth assigned to each output resources among the various flows requiring those output resources, adjusting the forwarding bandwidth allocated to each flow so that it remains within its allowable range.

Figure 11:
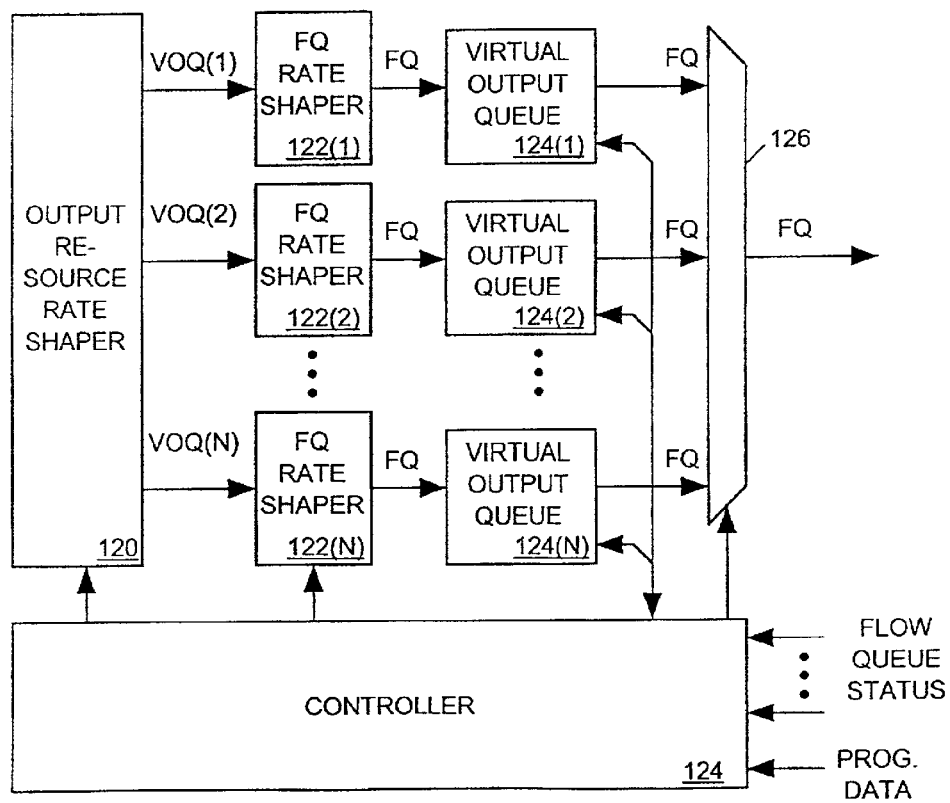

FIG. 11 illustrates in block diagram form the manner in which a typical traffic manager controls the rate at which cells of each flow are forwarded. The traffic manager includes an output resource rate shaper 120 for allocating cell forwarding bandwidth among a set of N output resources such as for example a set of output bus channels through which an output switch port forwards packets. Output resource rate shaper 120 produces N output signals VOQ(1)–VOQ(N), each associated with one of the N output channels and pulses each signal VOQ(1)–VOQ(N) at the rate at which the output resource is to forward cells. A controller 124 allocates forwarding bandwidth amount output resources by telling rate shaper 120 how frequently it is to pulse each of its output signals.

Each VOQ signal drives a separate flow queue (FQ) rate shaper 122(1)–122(N), each also corresponding to a separate output resource. Each FQ rate shaper 122(1)–122(N) periodically produces the flow queue ID of each active flow queue that is forwarded by the associated output resource. The frequency of each VOQ(1)–VOQ(N) input signal to one of FQ rate shapers 122(1)–122(N) indicates the forwarding bandwidth currently assigned by controller 124 to the corresponding output resource. Each VOQ(1)–VOQ(N) signal tells the FQ rate shaper 122(1)–122(N) how fast it is to generate FQ IDs and therefore how fast cells are to be forwarded by the corresponding output resource. Data from controller 124 tells each FQ rate shaper 122(1)–122(N) how to allocate their corresponding output resource's bandwidths among the flows assigned to those output resources. A corresponding "virtual output queue" 124(1)–124(N) shifts in the FQ IDs produced by each FQ rate shaper 122(1)–122(N). When any of virtual output queues 124(1)–124(N) is not empty, controller 124 shifts the longest-stored FQ ID out of the highest priority non-empty queue via a multiplexer 126. The FQ output of multiplexer 126 indicates the flow queue of the next cell to be forwarded by the traffic manager.

Controller 124 determines how bandwidth is to be allocated among each output resource and amount the flow queues assigned to each output resource based on flow queue data indicating which flow queues are active (i.e., which flow queues have cells currently in the cell buffer waiting to be forwarded) and on programming data indicating the minimum and maximum forwarding rates for each output resource and each flow queue. For example, since an output port may be able to forward packets on any of several output bus channels, its traffic manager first allocates the port's forwarding bandwidth among those bus channels. The traffic manager then sub-allocates the bandwidth allocated to each bus channel among the various flows that are to be forwarded by that bus channel. The traffic manager for an input port has an analogous job; it allocates its forwarding bandwidth among the various output ports to which it may forwarded cells, and then sub-allocates the bandwidth allocated to each output port among the various flows that are to be forwarded to that output port. Since the traffic managers of input and output ports have analogous functions, they are often implemented by identical circuits.

One difficulty with the prior art rate shaping system of FIG. 11 is that the flow queue and output resources rates are not independently adjustable. The switch port's forwarding bandwidth is allocated among its output resources based on the minimum and maximum forwarding rates for each output resource defined by programming data. The forward rate assigned to each output resource is then divided among the flow queues. Thus it is necessary to assign a forwarding rate to an output resource before it is possible to assign forwarding rates to the flow queues assigned to that output resource. This approach may be suitable for use in a network switch output port where the flow rates of output resources (output buses or bus channels) must be shaped. However in a network switch input port, it may not be necessary or desirable to shape an output resource's rate. The output resources of an input port are the output ports to which cells must be forwarded, and in many applications it would be preferable to permit an input switch port to forward cells to output ports via the switch fabric as fast as the output ports can accept them. The need to shape the output resource forwarding rates in a network switch input port can lead to an undesirable reduction in throughput.

What is needed is a bandwidth allocation system for a network switch port which can optionally allocate forwarding bandwidth to flow queues with or without having to shape the forwarding rates of output resources.

BRIEF SUMMARY OF THE INVENTION

A protocol processor of a network switch input port receives packets arriving on a network bus, converts them into uniform-sized cells and passes the cells to the input port's traffic manager. The traffic manager stores the cells in a cell memory and later reads the cells of each packet out of the cell memory and sends them to one of several forwarding resources (i.e., network switch output ports) via a switch fabric linking the switch's input and output ports. Each output port's traffic manager stores the cells the port receives in a cell memory and later reads them out of its cell memory and sends them to an output port protocol processor, which reassembles them into packets and forwards each packet outward via a network bus or a particular channel of a network bus. Thus the traffic manager in either the input or output switch port has a similar function, storing incoming cells in a cell memory and later forwarding each cell out of its cell memory toward one of a set of forwarding resources. Each output port constitutes a separate one of the "forwarding resources" of the input port since each input port can forward a cell to any one of the output ports. Each bus or bus channel accessed by an output port constitutes a separate "forwarding resource" of each output port. Data included in each cell references the forwarding resource to receive the cell.

A traffic manager in accordance with the invention assigns each cell stored in its cell memory to one of several flow queues such that all cells assigned to the same flow queue are to be forwarded to the same forwarding resource. The traffic manager maintains a separate virtual output queue (VOQ) associated with each possible forwarding resource and periodically loads a flow queue identification number (FQ ID) identifying a flow FQ into the VOQ associated with the forwarding resource of the cells assigned to that flow queue. The traffic manager also periodically shifts an FQ ID out of each non-empty VOQ and forwards the longest-stored cell assigned to the identified flow queue from the cell memory toward the forwarding resource associated with that VOQ.

In accordance with a further aspect of the invention the traffic manager separately adjusts the rates at which it loads FQ IDs into the VOQs and the rates at which it shifts FQ IDs out of each non-empty VOQ. In this way the traffic manager is able to separately control the rate at which the input or output port forwards cells of each flow queue and the rate at which each forwarding resource receives and forwards cells.

It is accordingly an object of the invention to provide a traffic manager that can independently adjust rates at which it a network switch input or output port forwards cells of each flow queue and the rate at which each forwarding resource receives cells from the input or output port.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

Figure 2A:
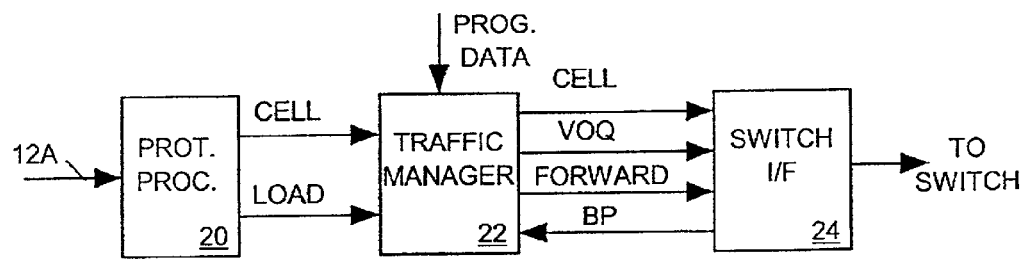
Figure 2B:
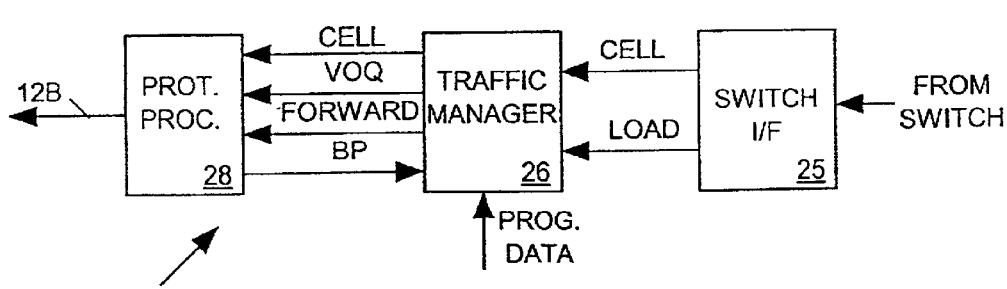
Figure 3:
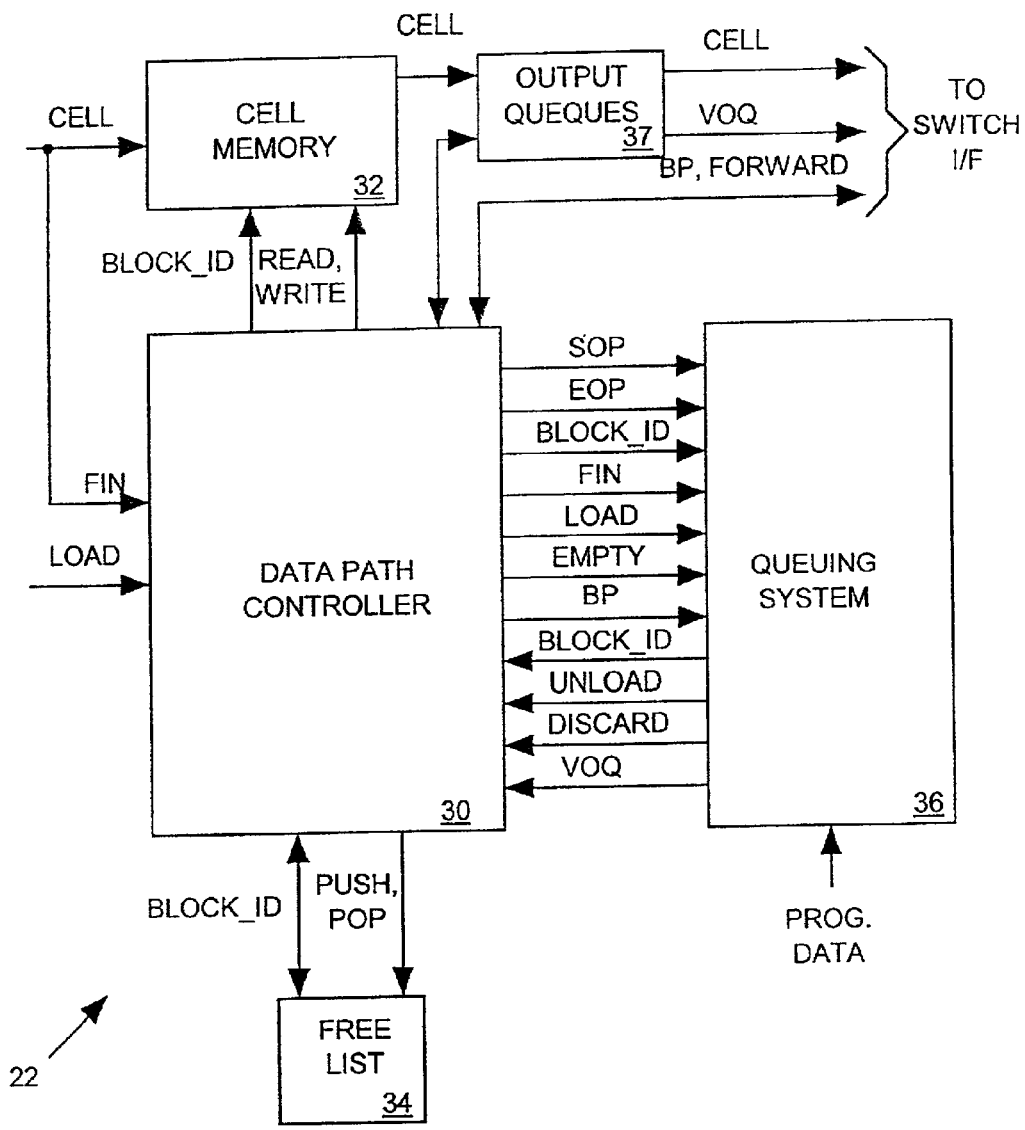
Figure 4:
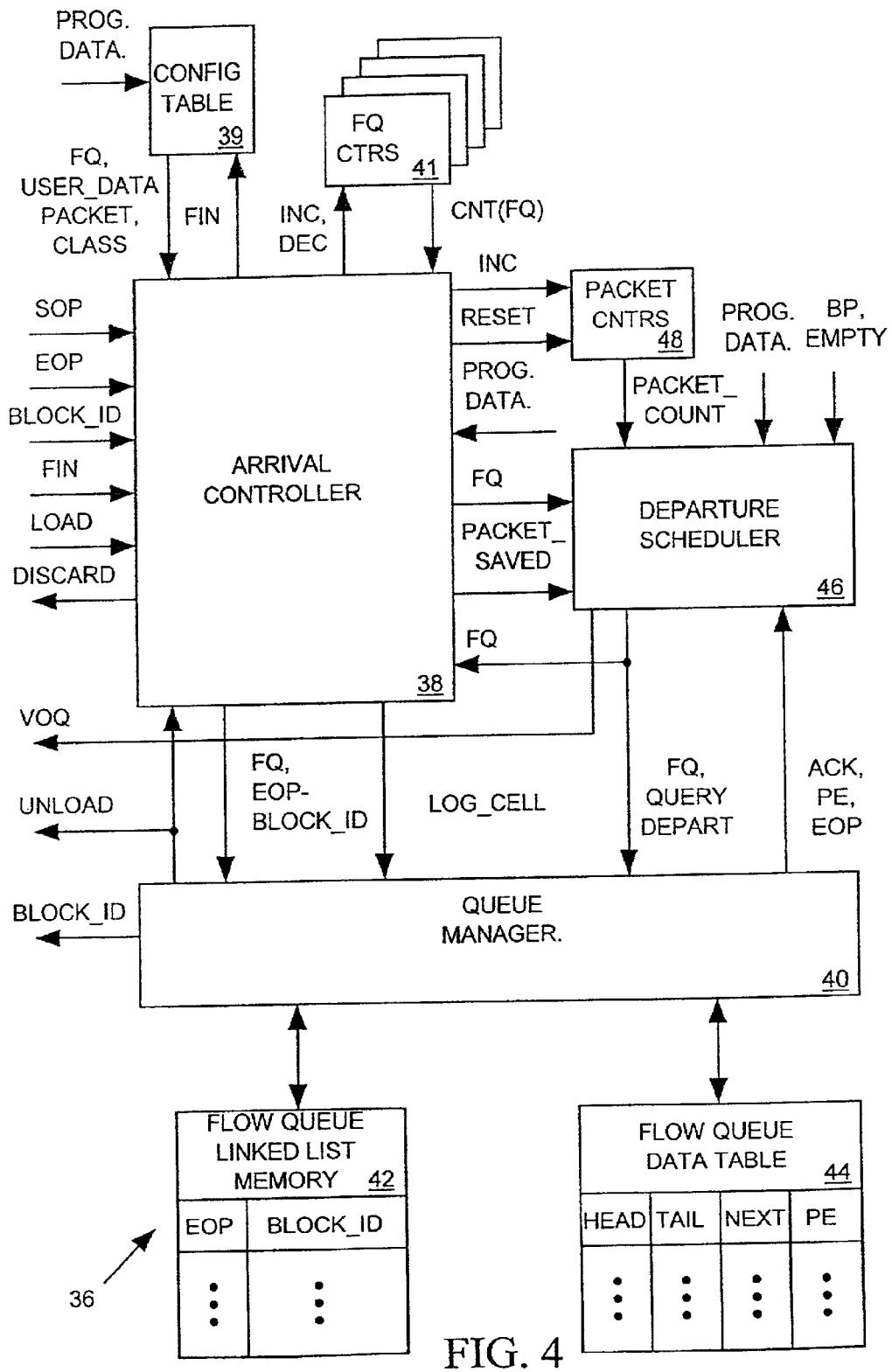
Figure 5:
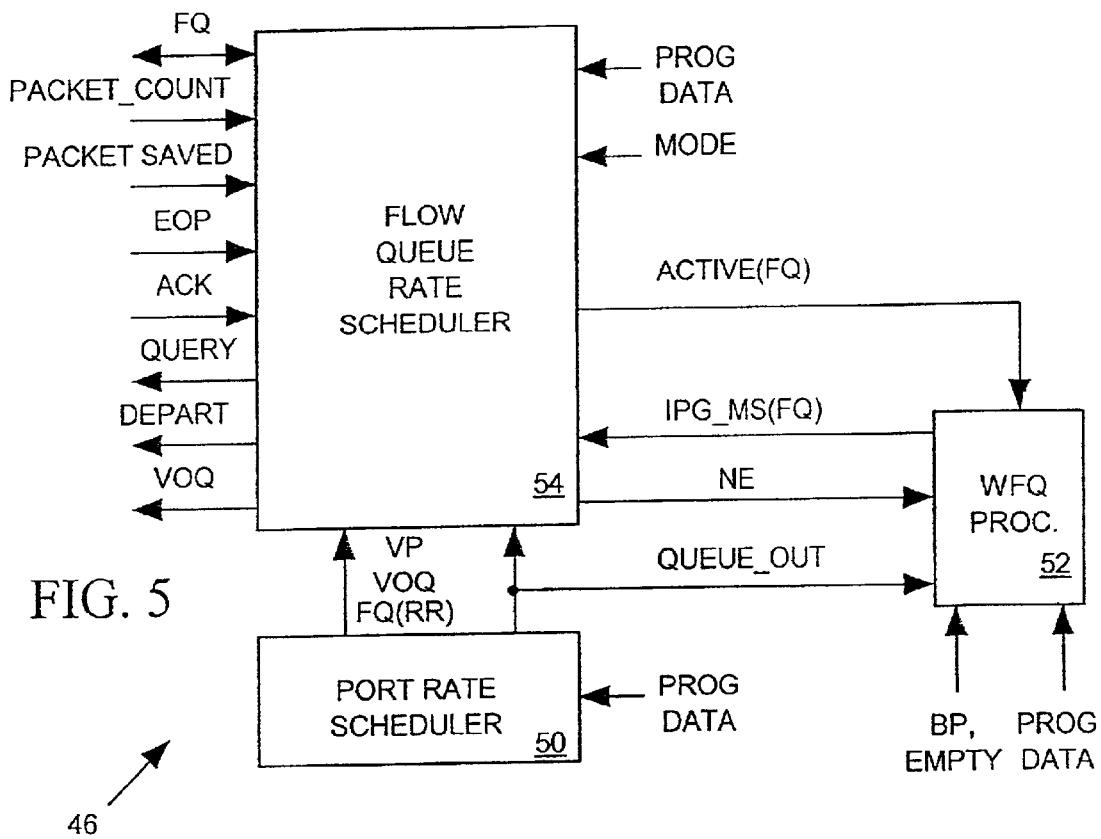
Figure 6:
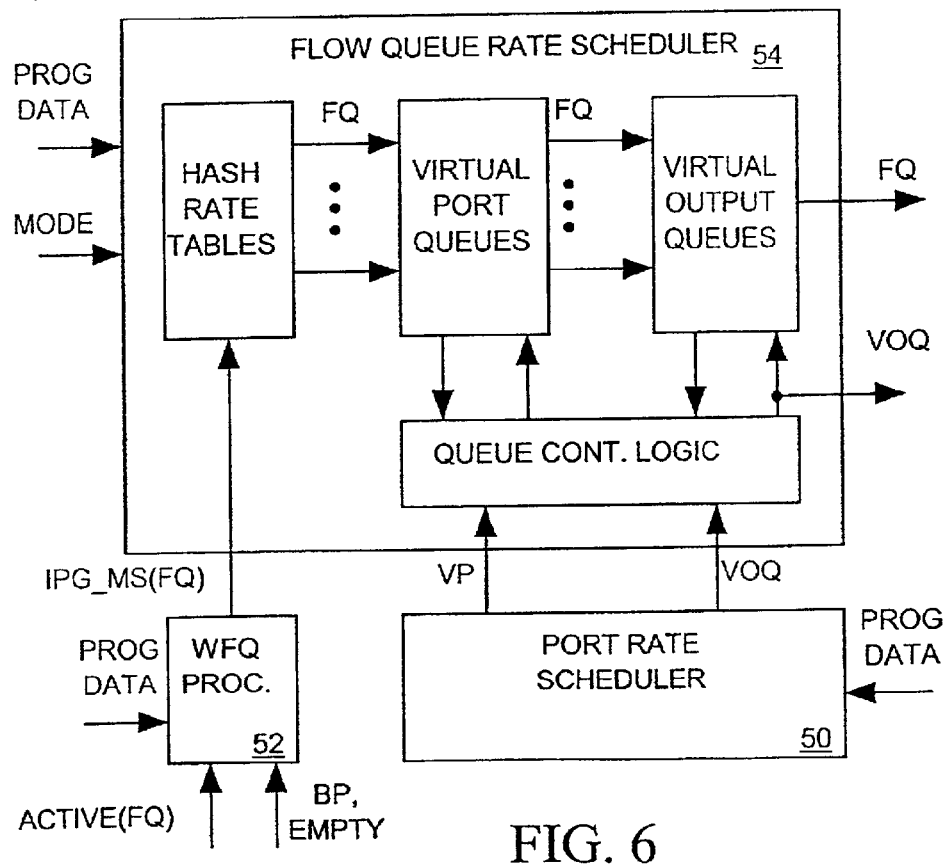
Figure 7:
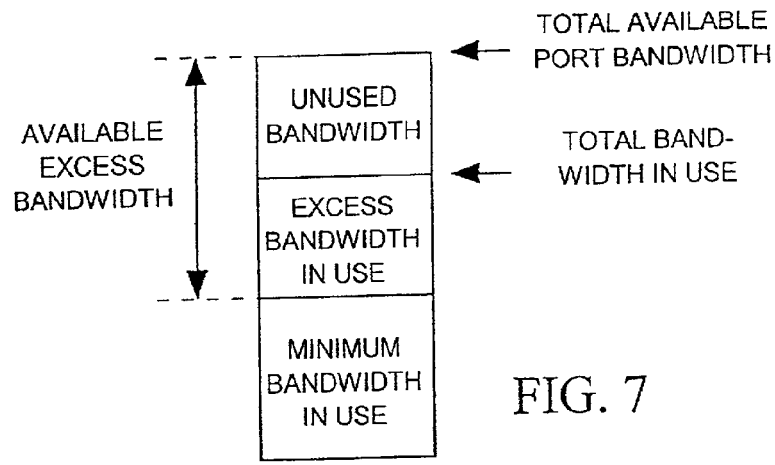
Figure 8:
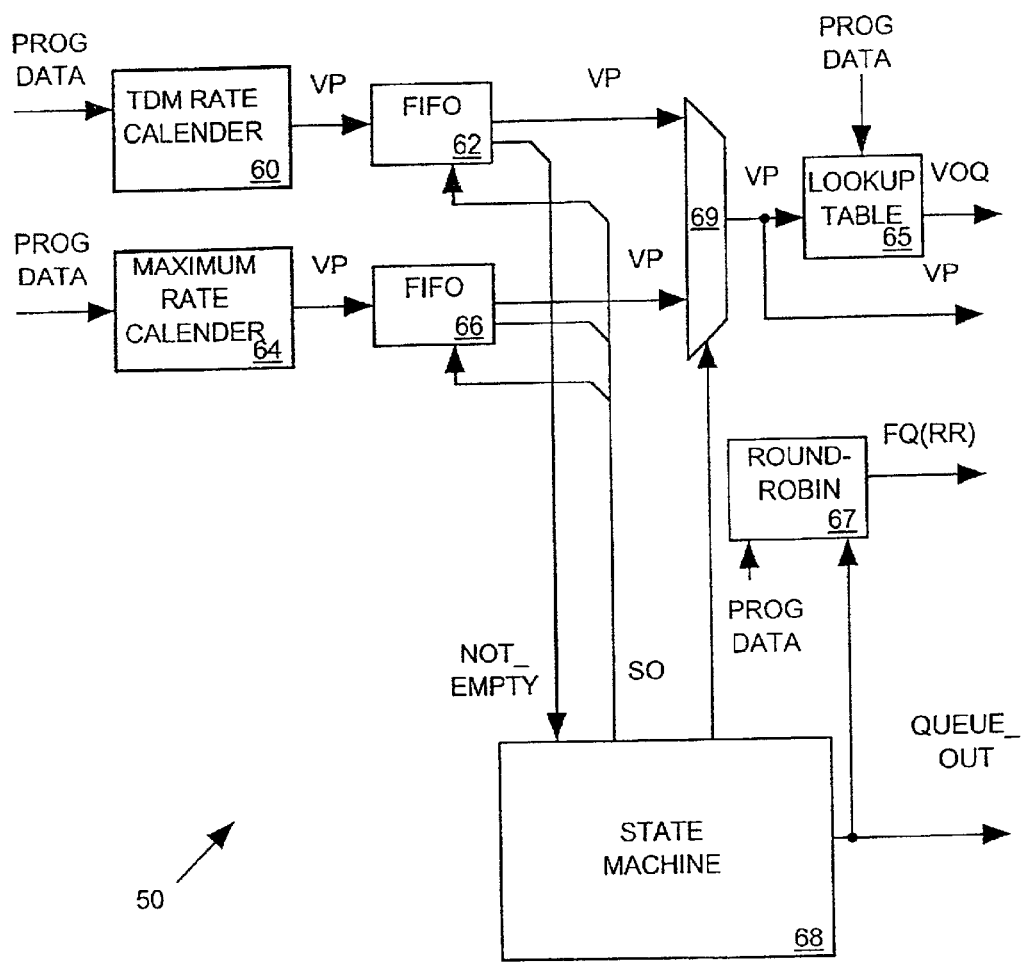
Figure 9:
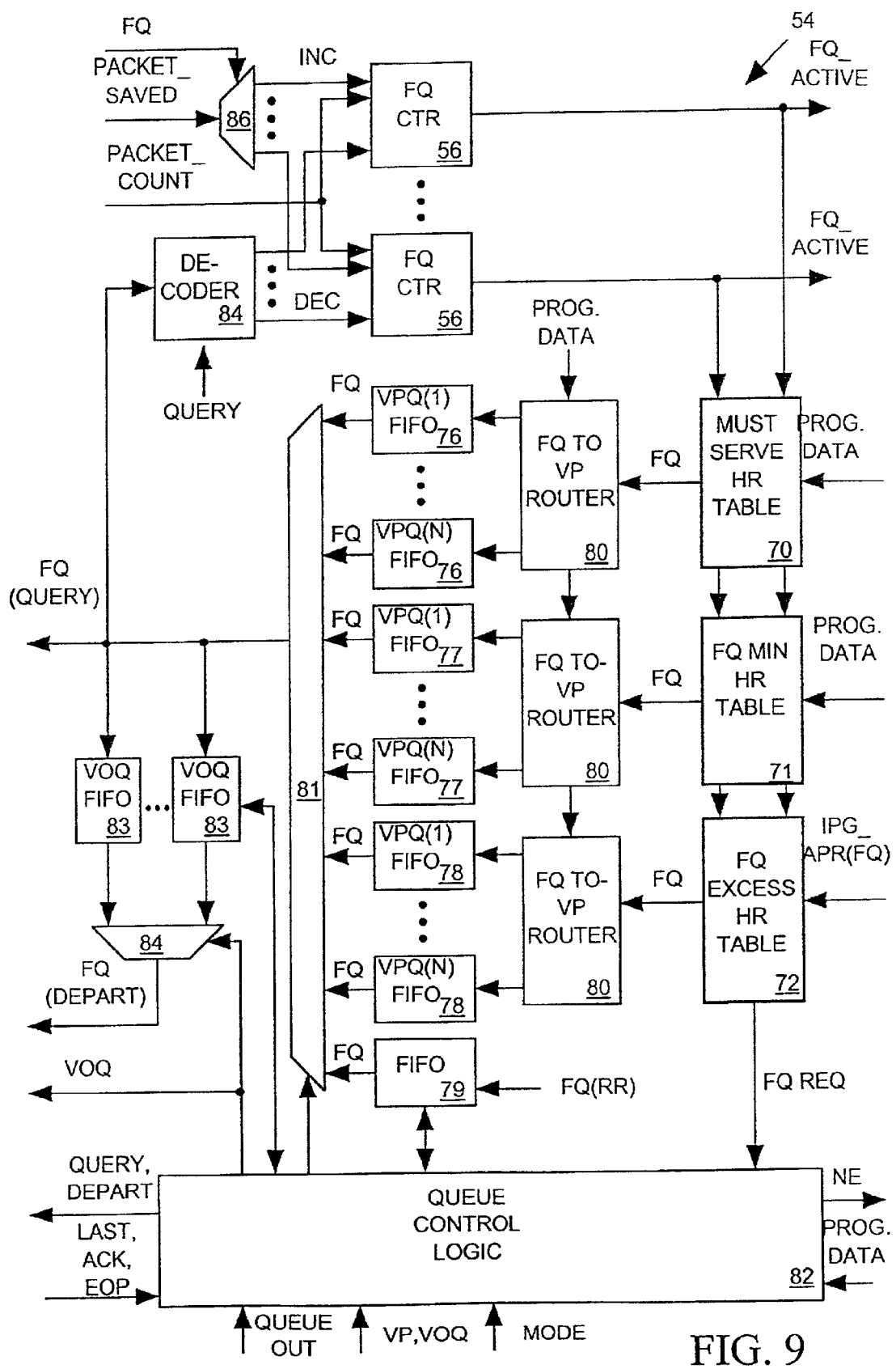
Figure 10:
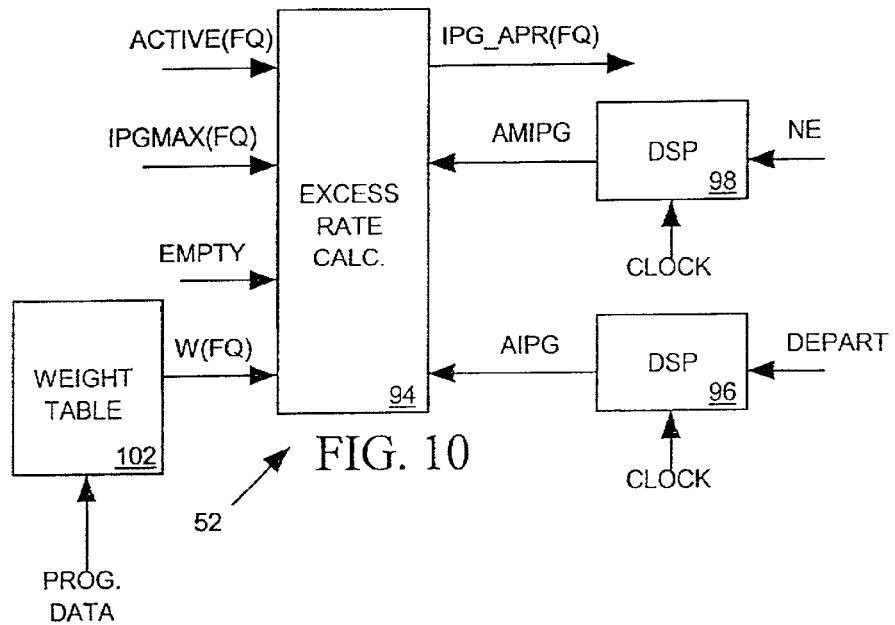

FIG. 1 illustrates a network switch 10 in accordance with the invention for routing network packets between network buses, FIG. 2A illustrates one input switch port of FIG. 1 in more detailed block diagram form, FIG. 2B illustrates one output switch port of FIG. 1 in more detailed block diagram form, FIG. 3 illustrates a traffic manager of FIG. 2A in more detailed block diagram form, FIG. 4 illustrates the queuing system of FIG. 3 in more detailed block diagram form, FIG. 5 illustrates the departure scheduler of FIG. 4 in more detailed block diagram form, FIG. 6 is a data flow diagram illustrating a manner in which the departure scheduler of FIG. 5 allocates cell forwarding bandwidth, FIG. 7 is a chart illustrating allocation of a switch port's cell forwarding bandwidth among flow queues, FIG. 8 illustrates the port rate scheduler of FIG. 5 in more detailed block diagram form, FIG. 9 illustrates the flow queue rate scheduler of FIG. 5 in more detailed block diagram form, FIG. 10 illustrates the weighted fair queuing processor of FIG. 5 in more detailed block diagram form, and FIG. 11 illustrates a prior art rate shaping system in block diagram form.

DETAILED DESCRIPTION OF THE INVENTION

Network Switch

FIG. 1 illustrates a network switch 10 in accordance with the invention for routing network transmissions (packets) between a set of network buses 12. Network switch 10 includes input switch ports 14, output switch ports 15, a crosspoint switch 16, and a routing control circuit 18. Each input switch port 14 receives incoming packets arriving on a separate input bus 12A and each output port 15 forwards outgoing packets on a separate output bus 12B. Although not shown in FIG. 1, each input switch port 14 may receive packets on more than one incoming bus 12A and each output port may selectively forward outgoing packets on more than one outgoing bus 12B or output bus channel. Crosspoint switch 16 selectively provides signal paths between input switch ports 14 and output ports 15 in response to control data from routing control circuit 18 based on routing requests from input switch ports 14.

Incoming packets arriving on buses 12A are network data transmissions that may be of any of a variety of formats such as, for example, variable length Ethernet packets. Each input switch port 14 converts each incoming packet to a sequence of one or more "cells" of uniform size and format, and stores each cell in an internal cell memory. Based on header data included in each packet arriving on one of buses 12A, the input switch port 14 that received the packet determines which output switch port 15 must forward the packet outward on one of outgoing buses 12B toward its intended destination. The receiving input switch port 14 then requests routing control circuit 18 to establish a signal path through crosspoint switch 16 to the appropriate output switch port 15. When routing control circuit 18 grants the request, the receiving input switch port 14 sequentially forwards all of the cells of the packet to the forwarding output switch port 15 via crosspoint switch 16. That output input switch port 15 stores the cells in its own cell memory as they arrive and thereafter reassembles the packet from those cells and forwards the packet outward on one of outgoing network buses 12B.

Switch Ports

FIG. 2A illustrates one input switch port 14 of FIG. 1 in more detailed block diagram form. Switch port 14 includes a protocol processor 20 for converting incoming packets on bus 12A into cell sequences. As protocol processor 20 produces each cell, it pulses a LOAD signal input to a traffic manager 22 to indicate when a CELL is available. Traffic manager 22 temporarily stores the cells derived from each received packet in an internal cell memory and determines from data included in the packet which output switch port 15 is to forward the packet outward from network switch 10. Thereafter traffic manager 22 sequentially forwards the cells of the packet to a switch interface circuit 24 pulsing a FORWARD signal to tell the switch interface circuit to acquire the cell. Traffic manager 22 also sends a code (VOQ) to switch interface 24 with each cell, the VOQ code identifying the output switch port 15 that is to receive the cells. Switch interface circuit 24 stores each incoming cell in an internal buffer and then requests routing control circuit 18 for a signal path to the forwarding output switch port 15 through crosspoint switch 16 of FIG. 1, and thereafter forwards the cell to the forwarding output switch port 15 via the requested signal path. Switch interface circuit 24 sends a back pressure signal BP to traffic manager 22 to tell it when its internal buffer is full and not able to receive any more cells.

FIG. 2B illustrates one output switch port 15 of FIG. 1 in more detailed block diagram form. When its switch interface 25 receives cells from crosspoint switch 16 it forwards them to a traffic manager 26, pulsing a LOAD signal input to indicate when each cell is available. Traffic manager 26 stores cells in an internal cell memory as they arrive, and after receiving the last cell of a sequence derived from an incoming packet, traffic manager 26 forwards the cell sequence to a protocol processor 28 pulsing a FORWARD signal to tell protocol processor 28 when a cell is available. Protocol processor 28 then reassembles the packet from the cell sequence and forwards it outward on the outgoing network bus 12B. Protocol processor 28 sends a back pressure signal BP to traffic manager 26 to tell it when its internal buffer is full and not able to receive any more cells.

Traffic Manager

FIG. 3 illustrates the input switch port's traffic manager 22 of FIG. 2A in more detailed block diagram form. (The output port's traffic manager 26 of FIG. 2B is generally similar in design and operation.) Referring to FIG. 3, traffic manager 22 includes a data path controller circuit 30 for responding to each LOAD signal pulse from protocol processor 20 (FIG. 2A) by writing the cell into a block of storage locations within a cell memory 32. Data path controller 30 maintains in memory a "free list" 34 of addresses of unused cell memory blocks. When a cell arrives from protocol processor 20, data path controller 30 pops a pointer (BLOCK_ID) to an available memory block from free list 34, passes the BLOCK_ID to cell memory 32, and pulses a WRITE signal telling cell memory 32 to store the incoming cell in the memory block identified by BLOCK_ID.

The network system assigns each packet to one of a set of "flows". Each flow has a defined class of service influencing, for example, the maximum and minimum rates and priority with the network switch forwards packets assigned to the flow. The flow to which a packet is assigned also determines which output port 15 (FIG. 1) is to forward the packet outward from network switch port. Each incoming data packet includes a "Flow Identification Number" (FIN) identifying the flow to which it has been assigned. When protocol processor 20 converts an incoming packet into a sequence of one or more cells, it includes the packet's FIN in each cell along with start of packet (SOP) and end of packet (EOP) bits indicating whether the cell is the first and/or last cell of the sequence of cells derived from the packet.

As it stores a cell in cell memory 32, data path controller 30 passes the cell's FIN, SOP bit and EOP bit, along with the BLOCK_ID of cell's storage location to a queuing system 36 and then pulses a LOAD signal to tell the queuing system when a cell has been stored in cell memory 32. Queuing system 36 uses the FIN, BLOCK_ID, SOP and EOP data to keep track of where the cells of each packet are stored in cell memory 32, to keep track of an order in which cells arrived, to keep track of which cells belong to the same packet, to determine an order in which data path controller 30 is to forward cells out of cell memory 32 to switch interface 24 of FIG. 2A, and to determine the VOQ number associated with the switch output port 15 (FIG. 1) that is to forward the packet outward from the network switch. Programming data (PROG DATA) supplied as input to queuing system 36 tells it how to determine forwarding priority, forwarding rates and forwarding output switch ports for all cells based on the cell's FIN.

Queuing system 36 also determines whether each arriving cell includes a valid FIN. If the FIN is not valid, queuing system 36 returns a DISCARD signal in response to the LOAD signal telling data path controller 30 to push the cell's BLOCK_ID back on free list 34, thereby effectively discarding the cell without forwarding it to crosspoint switch 16. Programming data input to queuing system 36 also allocates space in cell memory 32 to classes of cells based on their FINs. When the number of cells of a particular class approaches limits defined by the programming data, queuing system 36 signals data path controller 30 to discard some or all of the arriving cells of that class.

When queuing system 36 wants data path controller 30 to forward a particular cell out of cell memory 32, it sends the cell's BLOCK_ID and the VOQ number associated with the cells forwarding switch output port to the data path controller and then pulses an UNLOAD signal. Data path controller 30 has a set of internal queues, each associated with a separate VOQ, and stores each BLOCK_ID it receives from queuing system 36 in the internal queue identified by the accompanying VOQ number. Data path controller 30 forwards each BLOCK_ID from its internal queues to cell memory 32 in the order received, pulsing a READ signal to tell cell memory 32 to read the cell into one of a set of output queues 37, each associated with a separate VOQ number. Controller 30 then pushes the cell's BLOCK_ID back onto free list 34 to make the cell memory block available for holding another arriving cell.

When any one of output queues 37 is not empty, controller 30 forwards departing cells out of the output queue 37, along with the VOQ number associated with the output queue to switch interface circuit 24 of FIG. 2A as fast as the switch interface circuit can accept them using a FORWARD signal to indicate whenever a cell is available to the switch interface circuit. Switch interface circuit 24 returns a back pressure signal BP when its internal buffer is full and unable to accept more cells. The VOQ number indicates the switch output port that is to forward the cell. When output queues 37 are all empty, controller 30 asserts an EMPTY signal input to queuing system 36 which tells it that it may temporarily increase the rate at which it normally schedules cells for departure. When its internal departure buffer is nearly full controller 30 uses a multibit back pressure signal (BP) to tell queuing system 36 to reduce the rate at which it of schedules cells for departure. When its internal departure buffer is full, controller 30 sets the BP signal to tell queuing system 36 to stop scheduling cells for departure.

Queuing System

FIG. 4 illustrates queuing system 36 of FIG. 3 in more detailed block diagram form. Queuing system 36 keeps track of the location of each cell in cell memory 32 and determines when it time for data path controller 30 to forward each cell from the cell memory.

An arrival controller circuit 38 within queuing system 36 acquires the SOP, EOP, BLOCK_ID, and FIN data from data path controller 30 of FIG. 3 when the data path controller asserts the LOAD signal to indicate the arrival of a cell at data input terminals of cell memory 32. Arrival controller 38 applies the incoming FIN to a "configuration table" 39, a RAM-based lookup table programmed by input programming data. Configuration table 39 returns a set of configuration data (FQ, USER_DATA, PACKET, and CLASS) telling queuing system 36 how to handle the cell.

The returned flow queue identification number (FQ) identifies the particular "flow queue" to which the incoming cell is assigned based on its FIN. When configuration table 39 does not return a valid FQ identification number (ID), arrival controller 38 signals data path controller 30 to discard the cell. As discussed below, the flow queue to which cells are assigned influences the priority and rate with which the traffic manager forwards those cells to the switch interface and also determines which output switch port is to forward the cell outward from the network switch. The traffic manager may maintain many flow queues. Configuration table 39 assigns all cells of the same flow (i.e., all cells having the same FIN) to the same flow queue, though it may assign several flows to the same flow queue. All flows assigned to the same flow queue must be directed to the same output port, but not all flows directed to the same output port need be assigned to the same flow queue. All cells of the same flow queue are forwarded from the cell memory in the order they arrive, but since some flow queues have higher priority than others, cells assigned to different flow queues do not necessarily depart the cell memory in the order they arrive.

Arrival controller 38 keeps track of the number, CNT (FQ), of cells of each flow queue type stored in cell memory 32 of FIG. 3 using a separate counter 41 for each flow queue. Whenever an incoming cell arrives, configuration table 39 returns the cell's assigned flow queue ID (FQ) and arrival controller 38 increments the output CNT(FQ) of the corresponding FQ counter 41. Whenever queuing system 36 tells data path controller 30 of FIG. 3 to forward a cell out of cell memory 32, arrival controller 38 decrements the count associated with that cell's flow queue.

Input programming data supplied to arrival controller 38 allocates a particular maximum amount of the cell memory space to each flow queue. Arrival controller 38 uses FQ counters 41 to keep track of the number of cells of each flow queue stored in cell memory 32 of FIG. 3 because it needs to know when the portion of the cell memory allocated to each flow queue exceeds various levels defined by input programming data. This can happen when incoming packets for a particular flow queue arrive in the cell memory faster than they can be forwarded. When the amount of cell memory space occupied by a particular flow queue reaches any of those levels, arrival controller 38 begins to signal the data path controller 30 of FIG. 3 to randomly discard some of the cells of incoming packets of that flow queue. Generally, as the number of cells of a given flow queue in the cell memory rises to higher levels, arrival controller 38 more frequently discards incoming cells assigned to that flow queue. The CLASS data configuration table 39 returns to arrival controller 38 in response to a cell's FIN data assigns a "discard weight" to the incoming cell. When the number of cells in the cell memory assigned to a particular FQ reaches a defined limit, data path controller 30 begins to discard cells of that FQ; the higher an incoming cell's discard weight, the greater the probability that data path controller 30 will choose to discard that cell. Thus the CLASS data can be used to give cells of the same flow queue differing levels of discard priority based on their FINs.

A USER_DATA bit returned by configuration table 39 indicates whether the cell contains data from a normal system user or contains management data used internally for network control functions. Cells containing management data are very high priority, though normally low in volume, and are never discarded. Cells from system users can be very high volume, but may be discarded when necessary to keep cell memory 32 from getting too full.

When it decides an incoming cell is assigned to a valid flow queue and is not to be discarded, arrival controller 38 forwards the cell's FQ ID, EOP bit and BLOCK_ID to a queue manager 40 and pulses a LOG_CELL signal to tell queue manager 40 that cell data is available. Queue manager 40 maintains a separate BLOCK_ID pointer queue for each flow queue in the form of a linked list 42 implemented in RAM, and responds to the LOG_CELL signal by adding a new entry in the linked list 42 associated with the incoming cell's flow queue. Each Linked list 42 has a separate address for each BLOCK_ID in cell memory 32 of FIG. 3. Each entry in a flow queue's linked list 42 is associated with a cell stored in cell memory 32 that has been assigned to that particular flow queue. Each cell's FQ linked list 42 entry is stored at a memory address indicated by the cell's BLOCK_ID and includes the cell's EOP bit and the BLOCK_ID of the next arriving cell, if any, of the same flow queue.

When a cell arrives in cell memory 32, it may not be necessary or desirable for queue manager 40 to keep track of whether an individual cell was part of a group of cells derived from a single incoming packet. Accordingly, where the cells derived from a signal packet are to be treated as separate data transmissions, configuration table 39 normally returns a logically false PACKET data bit to arrival controller 38. This tells arrival controller 38 to automatically set logically true the EOP bit it forwards to queue manager 40 with an incoming cells' FQ and BLOCK_ID number. This makes each cell associated with the same packet look like it came from a separate packet and causes the network switch to forward the cell's data payload as a separate packet. However when the PACKET bit returned by configuration table 39 is true, arrival controller 38 forwards the cell's original EOP bit state to queue manager 40 with the cell's FQ and BLOCK_ID numbers, thereby preserving each cell's identity as a part of a sequence of cells derived from a packet.

Queue manager 40 keeps the BLOCK_ID of the longest-stored and most recently stored cells of each FQ in HEAD and TAIL fields of an entry of a flow queue data table 44 associated with the FQ. The HEAD cell is the next cell to be actually forwarded from the cell memory. Departure scheduler 46 internally queues cells of each flow queue for departure before they are sent out of the cell memory, and signals queue manager when each cell reaches the head of a queue and is ready to be forwarded out of the cell memory. Each entry flow queue data table 44 also includes a NEXT field, the purpose of which is discussed below.

A packet end (PE) bit stored in table 44 indicates whether any currently stored cell of the flow queue has an EOP bit that is set true. When cells of the flow queue are forwarded on a cell-by-cell basis, then all cells of the flow queue will have true EOP bits and the PE bit in the table 44 entry for that flow queue will always be true as long as any cell of the flow queue resides in the cell memory. However, when cells of a flow queue are forwarded on a packet-by-packet basis, then only the last cell of each packet's cell sequence has a true EOP bit. In such case the PE field of the entry in table 44 will only be true if the last cell of at least one packet sequence currently resides in the cell memory. As discussed later, the PE bit field in table 44 indicates whether a packet of cells may be forwarded on a cell-by-cell basis or must be forwarded on a packet-by-packet basis. Queue manager 40 updates table 44 whenever a cell arrives or departs the cell memory.

When any cell of a packet arrives with an EOP bit set true, arrival controller 38 transmits the incoming FQ ID for that flow queue to departure scheduler 46 and pulses a PACKET_SAVED signal to indicate that all of the cells of an incoming packet have been saved in the cell memory 32 of FIG. 3. Arrival controller 38 maintains a count (PACKET_COUNT) in one of a set of counters 48 of the number of cells for each arriving packet. Arrival controller 38 increments the count whenever a cell arrives and resets the count whenever it receives an SOP signal from data path controller 30 of FIG. 3. When departure scheduler 46 receives the PACKET_SAVED signal it acquires the current count (PACKET_COUNT) from one of packet counters 48. The incoming FQ and PACKET_COUNT data tell departure scheduler 46 the flow queue number of the most recently arrived packet and the number of cells that were derived from the packet.

Departure Scheduler

FIG. 5 illustrates departure scheduler 46 of FIG. 4 in more detailed block diagram form. FIG. 6 is a simplified data flow diagram illustrating a manner in which departure scheduler 46 controls forwarding rates of stored cells assigned to each flow queue (FQ). Departure scheduler 46 determines when each cell stored in cell memory 32 of FIG. 3 is to be forwarded to switch interface 24 of FIG. 2A and also determines which output switch port is to forward the cell. Departure scheduler 46 keeps track of the number of cells stored in cell memory 32 that are assigned to each flow queue, and when any cells of a particular flow queue are currently stored in cell memory 32, it allocates some of the forwarding bandwidth of traffic manager 22 (FIG. 2A) to that flow queue.

The invention relates in particular to the manner in which departure scheduler 46 controls the rates at which cells of the various flow queues depart the cell memory. Each flow queue has an assigned minimum and maximum allowable forwarding rate, and when cells assigned to a given flow queue reside in cell memory 32 (FIG. 3) departure scheduler 46 must make sure that cells of that flow queue are scheduled for departure from the cell memory at a rate that is between that flow queue's minimum and maximum allowable rates. Each flow queue may have a different allowable forwarding rate range.

The invention also relates to the manner in which departure scheduler 46 controls the rate at which it schedules cells or packets to be forwarded to various forwarding resources. A "forwarding resource", the next destination for a cell or packet that departs an input or output port, is identified by the FIN included in the cell or packet. Output switch ports 15 of FIG. 1 are the available forwarding resources for each input switch port 14 because that is where each input switch port sends cells based on their FINS. Output buses 12B, or channels thereof, are the forwarding resources for each output switch port 15. By contractual agreement, a network switch may be required to limit the rate at which it forwards packets on an outgoing bus 12B or a channel thereof to some maximum forwarding rate. Thus the traffic manager in an output port, in addition to ensuring that the forwarding rate for each flow queue remains within a predetermined range, must also be able to ensure that the rate at which it forwards cells or packets out of its cell memory that are destined for a given forwarding resource (output bus or bus channel) remains within some predetermined limit. That limit may be different for each output bus or bus channel. Since there is normally no need for an input switch port 14 to limit the rate at which it forwards cells to any output switch port 15 to some predetermined level, an input port will forward cells to each output switch port 15 as fast as the output ports can accept them. Thus while output ports 15 must separately control forwarding rates of each flow queue and for each forwarding resource (i.e. each output bus or bus channel), the input ports need only control forwarding rate for each flow queue.

As mentioned above, all cells having the same FIN are assigned to the same FQ, and more than one FIN may be assigned to the same FQ. Departure scheduler 46 assigns all cells of the same FQ to the same "virtual output queue" (VOQ) so that they are forwarded via crosspoint switch 16 (FIG. 1) to the same one of output switch ports 15. Thus the FQ ID to which a packet's FIN is assigned determines the switch output port through which a packet is forwarded.

Referring to FIG. 6, flow queue rate scheduler 54 controls allocation of forwarding bandwidth to the various flow queues. The flow queue to which a packet's FIN is assigned also influences the rate at which cells forming that packet, and all other packets assigned to the same flow queue, are forwarded to the output switch port 15. A set of hash rate tables 70–72 within flow queue rate scheduler 54 generate the FQ number of each flow queue at a rate corresponding to the allocated forwarding bandwidth of cells assigned to the corresponding flow queue.

Programming data input to hash rate tables 70–72 tell them to allocate a specified minimum portion of the switch port's cell forwarding bandwidth to each flow queue. A "weighted fair queuing" (WFQ) processor 52 also allocates among all active flow queues the portion of the switch port's cell forwarding bandwidth in excess of the sum of the minimum bandwidths allocated to all active flow queues. WFQ processor 52 supplies data IPG_MS(FQ) for each flow queue to hash rate tables 70–72 telling them how much of the excess bandwidth to allocate to each flow queue. WFQ processor 52 limits the amount of excess bandwidth allocated to each flow queue so that the flow queue's forwarding rate does not exceed a maximum limit indicated by input programming data. Hash rate tables 70–72 thus generate the FQ number of each flow queue at a rate equal to the sum of a minimum rate defined by the input programming data and an excess range defined by the IPGMS(FQ) control data from WFQ processor 52.

FIG. 7 graphically illustrates how WFQ processor 52 and hash rate tables 70–72 allocate the switch port's available bandwidth among the various flow queues. The sum of minimum bandwidths of all flow queues is the "minimum bandwidth in use" illustrated in FIG. 7. The difference between the port's maximum cell forwarding bandwidth and its minimum bandwidth in use is the port's "available excess bandwidth" that may be allocated among active flow queues in addition to their assigned minimum bandwidths. Since each flow queue also has a maximum allowable bandwidth, it may not always be possible to allocate all of the switch port's excess bandwidth among the active flow queues. Thus FIG. 7 depicts a portion of the available excess bandwidth that is not currently allocated as "unused bandwidth".

Referring again to FIG. 6, the FQ numbers generated by hash rate tables 70–72 are forwarded to three sets of virtual port queues (VPQs) 76–78. Each set 76–78 includes several (N) VPQs, each associated with a separate one of N "virtual ports". Each flow queue is assigned to one of the 3N VPQs 76–78 and each FQ number output of hash rate tables 70–72 is forwarded to its flow queue's assigned VPQ. Each VPQ of VPQ sets 76–78 is a first-in, first-out (FIFO) buffer which stores and forwards the FQ IDs in the order received. Port rate scheduler 50 generates an identification number (VP) of each virtual port at a rate at which cells of flow queues assigned to that virtual port are to be forwarded. Each generated VP number tells the VPQs associated with that virtual port to forward the longest-stored FQ number in its highest-priority VPQ to one of a set of "virtual output queues" (VOQs) 83, which are also FIFO buffers internal to flow queue rate scheduler 54 of FIG. 5.

Flow queue rate scheduler 54 (FIG. 6) includes a separate VOQ associated with each of the network switch's forwarding resources. Thus an input port's flow queue rate scheduler 54 includes a separate VOQ 83 for each network switch output port 15 (FIG. 2) to which the input port may forwarded cells, and an output port flow queue rate scheduler 54 includes a separate VOQ associated with each output bus or bus channel through which the output port may forward packets. Each VPQ 76–78 is assigned to one of the VOQs 83, though more than one virtual port VPQ may be assigned to the same VOQ. In a network switch input port 14 (FIG. 1), FQ numbers are shifted from the VPQs 76–78 into each VOQ 83 and then out of each VOQ 83 as fast as possible. Whenever an FQ number is shifted out of a VOQ 83, in other words the longest-stored cell assigned to that VOQ, departure scheduler 46 signals arrival controller 38 (FIG. 4) to signal data path controller 30 (FIG. 3) to forward the longest-stored cell assigned to that flow queue for departure from cell memory 32. Thus in an input port, hash rate tables 70–72 generate the FQ number of each flow queue at the rate the cells of that flow queue are to be forwarded from cell memory 32. Those FQ numbers are then shifted through VPQs 76–78 and VOQs 83 as quickly as possible. Therefore cells of each flow queue are scheduled for departure from the cell memory toward each output port at a rate determined by hash rate tables 70–72 without regard to any maximum rate associated with the output ports 15 that receive those cells.

However in an output port 15 (FIG. 1) each VOQ 83 is associated with a separate bus or bus channel though which the output port may forward packets, and when the buses or bus channels have maximum forwarding rate limitations, input MODE data tells flow queue rate scheduler 54 to allow port rate scheduler 50 to control the rate at which FQ numbers depart each virtual output queue 83. Port rate scheduler 50 tells flow queue rate schedule 54 when to forward FQ numbers from VPQs 76–78 and VOQs 83 so that FQs do not pass through any VOQ 83 at a rate that is faster than the maximum forwarding rate the bus or bus channels associated with the VOQ.

Whenever port rate scheduler 50 generates the VP number of a virtual port, the highest priority the virtual port queues 76–78 for that virtual port storing an FQ number (if any) for that virtual port, forwards the FQ number to the appropriate VOQ 83. At the same time, port rate scheduler also generates the VOQ number to which that virtual port has been assigned to tell that VOQ to generate its longest-stored FQ as output.

Thus in an output port 15, hash rate tables 70–72 and WFQ processor 52 control forwarding rates for each flow queue, while port rate scheduler 50 controls the rate at which the network switch output port forwards cells to each bus or bus channels associated with one of VOQs 83. Thus the forwarding rates for flow queues and virtual output queues are adjusted independently.

Port Rate Scheduler

FIG. 8 illustrates port rate scheduler 50 of FIG. 5 in more detailed block diagram form. When flow queue rate scheduler 54 of FIG. 5 is operating in a port rate shaping mode, port rate scheduler 50 allocates cell forwarding bandwidth among the various virtual ports and virtual output queues by generating the VP number of each virtual port and the VOQ number of each virtual output queue at appropriate rates. A virtual port may handle either of two types of traffic: "time domain multiplexing" (TDM) traffic that must be forwarded with relatively constant time intervals between cells at a particular assigned rate, and "maximum rate" traffic that is to be forwarded at some average maximum rate but which may be forwarded with somewhat more variable intervals between cells. Port rate scheduler 50 includes a TDM rate calendar 60 programmed by input programming data which generates the identification number (VP) of each virtual port at the constant rate at which that virtual port is to forward TDM traffic. A maximum rate calendar 64 also programmed by input programming data, generates the ID number (VP) of each port handling maximum rate traffic at the port's assigned maximum rate.

The VP outputs of TDM rate calendar 60 and maximum rate calendar 64 are shifted into FIFO buffers 62 and 66 as they are generated. A state machine 68 monitors FIFO buffers 62 and 66. When either one of those buffers is not empty as signified by a signal NOT_EMPTY, state machine 68 signals a multiplexer 69 to send the longest stored VP in that FIFO buffer to a lookup table 65 programmed by input programming data. Since timing is more important for TDM traffic, state machine 68 always gives FIFO buffer 62 priority when both FIFO buffers 62 and 66 are not empty.

The VP output of multiplexer 69 is sent to port rate scheduler 54 for controlling the rate at which the VPQs forward cells. Lookup table 65 generates the VOQ number of the virtual output queue to which the virtual port identified by the VP output of multiplexer 69 has been assigned. That VOQ number is also sent to flow queue rate scheduler 54 for use in controlling the rates at which the VOQs forward FQ numbers.

Whenever multiplexer 69 selects a new virtual port number VP and lookup table 65 generates a new VOQ number, state machine 68 asserts the QUEUE_OUT signal to tell flow queue rate scheduler 54 (FIG. 5) to queue a cell for a flow queue assigned to that VP/VOQ for departure. The QUEUE_OUT signal also clocks a "round-robin" generator 67 programmed by input programming data. Round-Robin generator 67, generates the number FQ(RR) of a flow queue assigned to the virtual port identified by the VP output of multiplexer 69. Round-robin generator 67 generates each flow queue number of all flow queues assigned to its input VP in round-robin fashion whenever clocked by the QUEUE_OUT signal. The QUEUE_OUT signal pulse to flow queue rate scheduler 50 tells it when the VP, VOQ and FQ(RR) output values are valid.

Flow Queue Rate Scheduler—Port Rate Shaping Mode

FIG. 9 illustrates flow queue rate scheduler 54 of FIG. 5 in more detailed block diagram form. Flow queue rate scheduler 54 includes hash rate (HR) tables 70–72, each for generating a sequence of FQ IDs. The rate at which tables 70–72 generate the FQ number of each flow queue controls the rate at which cells assigned to the FQ are forwarded out of cell memory 32 of FIG. 3. When flow queue rate scheduler 54 is operating in its port rate shaping mode as selected by input MODE data, port rate scheduler 50 of FIG. 5 controls the rate at which cells are forwarded to each of the port's output resources. This mode is normally used in an output port 15 (FIG. 1) to control the rate at which the port forwards cells or packets on the port's variable output buses 12B or channels thereof. Hence in the port rate shaping mode, not only are the forwarding rates of each flow queue separately adjusted, but the rate at which each of the port's output resources receive cells are also separately adjusted.

A set of flow queue counters 56 keep track of the number of cells currently residing in the cell memory for each flow queue. When a flow queue has cells currently residing in the cell memory, the counter 56 associated with that flow queue asserts an FQ_ACTIVE signal input to tables 70–72 to tell them that the flow queue is active. Arrival controller 38 (FIG. 4) uses packet counters 48 to keep track of the number of cells in each arriving packet. When the last cell of a packet arrives, it asserts a PACKET_SAVED signal. A multiplexer 86 controlled by an FQ output of arrival controller 38 routes the PACKET_SAVED signal as an increment signal INC to the appropriate flow queue counter 56 which increments its current count by the value of the PACKET_COUNT data. A decoder 84 decodes the FQ output of a multiplexer 81 in response to each pulse of the QUERY signal to supply a DEC signal to one of flow queue counters 56 causing it to decrement its cell count.

Each flow queue counter 56 asserts its FQ_ACTIVE output when its count rises above zero to tell tables 70–72 that a corresponding flow queue is "active". A flow queue is active when cells of that flow queue residing in cell memory 32 (FIG. 3) have not yet been scheduled for departure. When a flow queue is active, one or more of tables 70–72 generates FQ IDs for that flow queue at the average rate at which cells of that flow queue are to be forwarded from the cell memory. Each flow queue counter 56 stops asserting its FQ_ACTIVE output when its count falls to zero to tell tables 70–72 that any cells of a particular FQ currently residing in the cell memory have already been scheduled for departure and that tables 70–72 should stop generating FQ IDs for that flow queue.

Some high priority, low volume traffic such as network management traffic may be assigned to "must serve" flow queues accorded fixed forwarding bandwidth defined by programming input data. A "must serve" hash rate table 70 generates the FQ ID of each currently active must serve flow queue at the rate at which cells of that flow queue must be forwarded. Each lower priority flow queue may be allocated a minimum rate at which cells assigned to that flow queue must be forwarded when the flow queue is active. When such a flow queue is active, an FQ minimum HR table 71 produces an output FQ ID sequence at for each flow queue at that flow queue's allocated minimum forwarding rate, as defined by input programming data.

Weighted fair queuing processor 52 of FIG. 5 may also allocate a portion of a virtual port's excess bandwidth to each active FQ in addition to the must serve rate or minimum rates allocated by tables 70 and 71. An FQ excess HR table 72 produces the FQ ID of every active flow queue at a rate determined by the excess forwarding bandwidth currently allocated to that flow queue by data IPG_APR (FQ) supplied by WFQ processor 52. The rate at which the traffic manager forwards cells of each flow queue therefore matches the rate at which tables 70–72 generate that flow queue's FQ ID.

Some or all of the available forwarding bandwidth of the input switch port is allocated among N virtual ports, and each flow queue is assigned to one of those N virtual ports. Flow queue rate scheduler 54 includes a set of three FIFO buffers 76–78 for each of the N virtual ports. A set of three router circuits 80 route each FQ output of tables 70–72 to the appropriate one of VOQ FIFO buffers 76–78 as indicated by input programming data. High priority FIFO buffers 76 receive FQs from must serve HR table 70, medium priority FIFO buffers 77 receive FQs from FQ minimum HR table 71, and low priority FIFO buffers 78 receive FQs from excess HR table 74. When input MODE data places flow queue rate schedule 54 in its port rate shaping mode, port rate scheduler 50 (FIG. 8) shifts its generated FQ(RR) numbers into a lowest priority FIFO buffer 79.

Cells of each flow queue are scheduled for departure from the cell memory either on a cell-by-cell or a packet-by-packet basis by shifting the flow queue's FQ ID into one of a set of VOQ FIFO buffers 83. One or more cells are actually sent out of the cell memory ("departed") after each FQ ID later reaches the front of one of VOQ FIFO buffers 83 and is forwarded to queue manager 40 of FIG. 4.

When departure scheduler 46 (FIG. 4) operates in its port rate shaping mode as selected by input MODE control data to a queue control logic circuit 82, port rate scheduler 50 controls rates at which cells are forwarded to the output resource (such as switch output bus or output bus channel) associated with each VOQ FIFO buffer 83. Whenever port rate scheduler 50 (FIG. 8) generates a VP/VOQ number pair and pulses the QUEUE_OUT signal, it tells queue control logic 82 that one cell of a flow queue assigned to the virtual port identified by the VP number (of value 1 to N) may be queued for departure, and that one cell of a flow queue assigned to the identified virtual port may be actually departed from the cell memory.

In responding to the QUEUE_OUT signal pulse, queue control logic circuit 82 first sets multiplexer 81 to select the longest-stored FQ ID output of one of buffers 76–79 to provide that FQ ID as input to each of VOQ buffers 83, though it does not immediately shift the FQ ID into any of buffers 83. Queue controller 82 sets multiplexer 81 to select the highest-priority, non-empty VPQ buffer 76–78 for the virtual port number indicated by the VP data produce port rate scheduler 50. When all buffers 76–78 associated with a particular VP number are empty, queue control logic 82 tells multiplexer 81 to select the current FQ ID output of FIFO buffer 79.

A separate VOQ FIFO buffer 83 is provided for each forwarding resource. In an input port, there would be one VOQ FIFO buffer 83 for each output port 15 (FIG. 1). In an output port 15 (FIG. 1) there would be one VOQ FIFO buffer 83 for each output bus 12B or channel thereof on which the output port 15 may forward packets.

Queue control logic 82 determines whether cells of the flow queue identified by FQ ID output of multiplexer 81 are to be queued for departure on a cell-by-cell basis or on a packet-by-packet basis. In the later case, the queue control logic 82 also determines whether the next cell to be queued for departure is the last cell of a packet's cell sequence. To make such a determination, queue control logic 82 pulses a QUERY signal input to queue manager 40 of FIG. 4.

As described above, queue manager 40 keeps the BLOCK_ID of the longest-stored cell of each FQ in a HEAD field of an entry of table 44 associated with the FQ and stores the BLOCK_ID of the next cell to be queued for departure from the cell memory in the NEXT field. The PE bit stored in table 44 is set true when any currently stored cell of the flow queue has a true EOP bit and is otherwise set false. Queue manager 40 responds to the QUERY signal pulse from queue control logic 82 (FIG. 9) by looking up the BLOCK_ID of the NEXT cell in table 44 and then obtaining that cell's EOP bit from linked list 42, returning it along with the PE bit from table 44 to queue control logic 82, pulsing an acknowledge signal ACK, and then updating the NEXT field of table 44 to point to a next cell to be queued for departure.

The returned EOP bit will be true if the NEXT cell to be queued for departure is the last cell of a packet sequence or is any cell of a sequence that is to be forwarded on a cell-by cell basis. When that EOP bit is true, queue control logic 82 shifts the FQ ID into one of FIFO buffers 83 identified by the VOQ number provided by port rate scheduler 50. If the EOP bit is false, indicating that the cell is to be forwarded on a packet-by-packet basis and is not the last cell of the packet sequence, then queue control logic 82 does not shift the FQ ID into any of VOQ FIFO buffers 83.

Once it has decided whether to shift the FQ ID into FIFO buffers 83 and has done so, thereby queuing either a cell or a packet for departure, queue control logic 82 determines whether the returned PE bit is true. When the PE bit is not true, indicating that cells of the flow queue are to be forwarded on a packet-by-packet basis and that the last cell of a packet still resides in the cell memory, control logic 82 does nothing more in response to the QUEUE_OUT signal pulse other than to shift the FQ data out of the particular FIFO buffer 76–79 selected by the VP data.

When the PE bit is true, queue control logic 82 sends a DEPART signal pulse to queue manager 40 to tell it to signal data path controller 30 (FIG. 3) to read the longest-stored (HEAD) cell of that flow queue out of the cell memory and writes it into one of output queues 37 so that it may be forwarded to switch interface 24 of FIG. 2A. The VOQ number associated with that FIFO buffer 83 is forwarded to data path controller 30 to tell it which output queue 37 is to receive the cell. Queue manager 50 also returns to queue control logic 82 the EOP bit from the HEAD cell's entry in linked list 42, and pulses the ACK signal again. Queue manager 50 also updates the HEAD field of table 44 to point to a next longest-stored cell of the flow queue.

When the returned EOP bit is true, queue control logic 82 responds to the second pulse of the ACK signal by shifting the FQ ID out of the VOQ FIFO buffer 83 currently selected by multiplexer 81. When the returned EOP bit is false, indicating that the departed cell is not the last cell of a sequence being forwarded on a packet-by-packet basis, queue control logic refrains from shifting the FQ bit out of that VOQ FIFO buffer 83. In either case queue control logic 82 shifts the FQ data out of the currently selected FIFO buffer 76–79.

Flow Queue Rate Scheduler—Non Port Rate Shaping Mode

An input switch port 14 (FIG. 1) tries to forward cells to each output port 15 as fast as possible, provided that it keeps the forwarding rate for each flow queue within the predetermined forwarding rate range for that flow queue. The MODE control input to the queue control logic circuit 82 in an input switch port 14 will therefore place it in a "non port rate shaping" mode in which it ignores the control data outputs of port rate scheduler 50 and shifts FQ numbers through VPQ buffers 76–78 and VOQ buffers 83 as fast as it can. Queue control logic 82 shifts FQ numbers out of non-empty higher priority VPQs 76 in round-robin fashion. When all VPQ buffers 76 are empty, it shifts FQ numbers out of non-empty medium priority VPQs 77 in round-robin fashion. When all VPQ buffers 76 and 77 are empty, it shifts FQ numbers out of non-empty low priority VPQs 78 in round-robin fashion. Queue control logic loads each FQ numbers shifted out of VPQs 76–78 into the appropriate VOQ 83 and forwards FQs out of the VOQ buffers 83 in round robin fashion as fast as queue manager 40 (FIG. 4) can accept them. Thus the rate at which departure scheduler 46 schedules cells to be forwarded from the cell memory depends only on the established forwarding rates for the flow queues to which they belong and not on any predetermined rates at which the output resources can accept them.

Weighted Fair Queuing Processor

FIG. 10 illustrates WFQ processor 52 of FIG. 5 in more detailed block diagram form. WFQ processor 52 supplies the flow rate control data inputs to flow queue excess hash rate table 72 of flow queue rate scheduler 54 of FIG. 9 for controlling the rate at which table 72 generates FQ IDs for each flow. The rate at which table 54 generates the FQ ID of each flow queue determine the excess bandwidth allocated to that flow queue.

A flow queue is active when cells assigned to that flow queue reside in cell memory 32 of FIG. 2A. The ACTIVE (FQ) outputs of counters 56 of FIG. 5, indicating which flow queues are currently active, provide input to an excess rate calculator 94, which generates the IPG_APR(FQ) control data input to FQ excess HR table 72 of FIG. 9. That data controls the rate at which table 72 generates each FQ ID. Excess rate calculator 94 determines the magnitude of the IPG_APR(FQ) data for each value of FQ based on several factors. Once such factor, "average interpacket gap" (AIPG) is generated by a digital signal processing (DSP) circuit 96 which computes an average period between QUEUE_OUT signals generated by port rate scheduler 50 of FIG. 5 over several CLOCK signal cycles. The QUEUE_OUT signal frequency is a measure of the input port's total available bandwidth. The QUEUE_OUT signal frequency is normally fixed by programming data but is occasionally reduced when switch interface circuit 24 (FIG. 2) asserts the back pressure input signal BP to state machine 68.

A similar DSP circuit 98 supplies excess rate calculator 94 with an "average minimum interpacket gap" data value (AMIPG) indicating a time-averaged delay between FQ IDs generated by must serve table 70 and minimum HR table 71 of FIG. 9. Queue control logic circuit 82 of FIG. 9 generates a "not-excess" signal pulse NE in response to each QUEUE_OUT signal pulse whenever it is currently signaling multiplexer 81 to select the output of one of FIFO buffers 76 or 77. Thus the average period between NE signal pulses (the value of the AMIPG data output of DSP circuit 98) is a measure of the average period between must serve and minimum rate cells departing cell memory 32 of FIG. 3.

Input program data programs a weight table 102 supplying excess rate calculator 94 with separate weight data W(FQ) for each flow queue. When the ACTIVE(FQ) data indicates that a flow queue is inactive, excess rate calculator 94 does not allocate any excess bandwidth to that flow queue. However when a flow queue is active, rate calculator 94 allocates an amount of excess forwarding bandwidth to flow queue based in part on its weight relative to the weight of other active flow queues, as described in more detail below.

Each flow queue may be allocated only a predetermined maximum excess forwarding bandwidth indicated by programming data IPGMAX(FQ) supplied as input to excess rate calculator 94. The IPGMAX(FQ) data expresses each flow queue's maximum allowable excess bandwidth in terms of an allowable value of the IPG_APR(FQ) output data of excess rate calculator 94. The larger the value of IPGMAX(FQ) for a particular flow queue, the larger the minimum allowable delay between FQ IDs generated by excess HR table 72 of FIG. 9, and the smaller the allowable amount of excess bandwidth that may be allocated to the flow queue.

Excess rate calculator 94 calculates the value of its output IPG_APR(FQ) data for each active flow queue in accordance with the following expression:

$$IPG\_APR(FQ) = \max\left(\frac{(W_T/W(FQ)(1/OSF)}{(1/AIPG) - (1/AMIPG)}, IPGMAX(FQ)\right) \quad [1]$$

In the above expression, the $W_T$ parameter is the current sum of weight values W(FQ) for all flow queues and the OSF parameter is an "overshoot factor" described below. The OSF parameter usually has a value of 1, though it can be temporarily increased.

The AIPG and AMIPG parameters are the outputs of DSP circuits 96 and 98 of FIG. 10. Expression [1] above uses the AIPG value as a measure of total available port bandwidth and uses the AMIPG value as a measure of the portion of the port's bandwidth currently satisfying the must serve and minimum bandwidth requirements of all flow queues. Thus the value (1/AIPG)–(1/AMIPG) is a measure of the total available excess port bandwidth that may be allocated among the currently active flow queues. Expression [1] employs a moving average, measuring total and minimum interpacket gap values AIPG and AMIPG (rather than instantaneous measured IPG values) in order to dampen the excess rate calculator's feedback response to changes in flow queue active status, thereby damping rapid swings in flow rates that would otherwise result from traffic bursts.

The factor $W_T/W(FQ)$ in expression [1] ensures that the amount of excess bandwidth an active flow queue is allocated is in proportion to a ratio of that flow queue's weight to the sum of weights of all active flow queues. Thus by adjusting the weight data values produced by weight table 102, and by adjusting the IPGMAX(FQ) data input to excess rate calculator circuit 94, we can influence how the traffic manager allocates excess bandwidth among active flows. Normally flows with higher maximum bandwidths (lower IPGMAX(FQ) values) should be accorded greater weights.

When data path controller 30 of FIG. 3 senses that all output queues 37 are empty, it sends an EMPTY signal to excess rate calculator 94 within traffic manager 22. The overshoot factor OSF in equation [1] is normally set to 1, but on receiving the EMPTY signal, excess rate calculator 94 temporarily sets overshoot factor OSF to a high value. This can temporarily increase the bandwidth initially allocated to flows that thereafter become active, thereby "overshooting" the actual bandwidth of the port. When data path controller 30 subsequently loads cells into its internal cell buffer, it turns off the EMPTY signal, thereby causing excess rate calculator 94 to reset the overshoot factor OSF to unity.

On system startup, when no flow queues are active, excess rate calculator 94 nulls the interpacket gap value IP_APR(FQ) for all values of FQ. This tells HR tables 72 of FIG. 9 to refrain from producing any output FQ IDs. Hence no flow queue receives any portion of the port's excess forwarding bandwidth. Thereafter when cells of a particular flow queue (for example FQ=1) are stored in the cell memory, and that flow queue has been assigned a minimum and maximum flow rate, the ACTIVE(1) data for that flow queue causes excess rate calculator 94 to set its output IPG_APR(FQ) to a non-zero value and expression [1] for flow queue 1 reduces to IPGMAX(1), the minimum allowable excess interpacket gap (producing maximum allowable bandwidth) for flow queue 1. Thus excess rate calculator 94 allocates flow queue 1 all of the flow queue's maximum allowable excess bandwidth.

When a second flow queue, for example flow queue 2, also becomes active, IPG_MIN(2) takes on a non-zero value. As it re-evaluates expression [1] for each flow, excess rate calculator 94 re-allocates the port's excess bandwidth between the two active flow queues in accordance with their relative weights W(1) and W(2). Flow queue 1 receives the proportion W(1)/[W(1)+W(2)] of the excess bandwidth and flow queue 2 receives the proportion W(2)/[W(1)+W(2)] of the excess bandwidth, though neither flow queue may be allocated more bandwidth than is allowable by its corresponding IPGMAX(FQ) data input to excess rate calculator 94. As more flow queues become active, or as active flow queues become inactive, excess rate calculator 94 continues to re-allocate the port's excess bandwidth among all active flow queues in accordance with expression [1].

Thus has been shown and described a forwarding bandwidth allocation system for a network switch port which allocates the port's forwarding bandwidth only to active flow queues according to predetermined forwarding weights assigned to each flow queue.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A traffic manager for a network switch port for storing incoming cells derived from network data transmissions in a cell memory and for thereafter forwarding each cell from the cell memory, wherein each cell includes data referencing a forwarding resource to receive and forward the cell forwarded from the cell memory, the traffic manager comprising:

first means for assigning each cell stored in the cell memory to one of a plurality of flow queues (FQs) such that only cells including data referencing the same forwarding resource are assigned to the same FQ, each flow queue being identified by a separate flow queue identification number (FQ ID);

a plurality of virtual output queues (VOQs), each associated with a separate forwarding resource;

second means for periodically loading each flow queue's FQ ID into the VOQ associated with the forwarding resource referenced by the data included in the cells assigned to that flow queue, and for periodically removing an FQ ID from each VOQ whenever the VOQ contains at least one FQ; and third means for storing each incoming cell in the cell memory, for receiving each FQ ID the second means removes from any of the VOQs and, when the cell memory stores a cell assigned to any received FQ ID, for responding to the received FQ ID by forwarding that cell from the cell memory.

2. The traffic manager in accordance with claim 1 wherein the second means separately adjusts a rate at which it loads FQ IDs of each FQ into the VOQs.

3. The traffic manager in accordance with claim 1 wherein the second means separately adjusts a rate at which it removes FQ IDs from each VOQ containing at least one FQ.

4. The traffic manager in accordance with claim 1 wherein the second means separately adjusts a rate at which it loads FQ IDs of each FQ into the VOQs and a rate at which it removes FQ IDs from each VOQ containing at least one FQ.

5. The traffic manager in accordance with claim 1 wherein each flow queue has an assigned one of a plurality of priority levels, and wherein the second means comprises:

a plurality of sets of virtual port queues (VPQs), wherein each set of VPQs is associated with a separate one of said forwarding resources, and wherein the VPQs of each set is associated with a separate one of the plurality of priority levels; and third means for periodically generating the FQ ID of each flow queue and for loading each flow queue's FQ ID into one of the VPQs associated with the forwarding resource referenced by the data included in the cells assigned to that flow queue and having associated there with the flow queue's assigned priority level, for removing FQ ID's from the VPQ's and loading them into the VOQs in an order determined in accordance with the priority levels associated with the VPQs, and for periodically removing an FQ ID from each VOQ whenever the VOQ contains at least one FQ.

6. The traffic manager in accordance with claim 5 wherein the third means separately adjusts a rate at which it loads FQ IDs of each FQ into the VOQs.

7. The traffic manager in accordance with claim 5 wherein the third means separately adjusts a rate at which it removes FQ IDs from each VOQ containing at least one FQ.

8. The traffic manager in accordance with claim 5 the wherein third means separately adjusts a rate at which it loads FQ IDs of each FQ into the VOQs and a rate at which it removes FQ IDs from each VOQ containing at least one FQ.

9. A method for a network switch port for storing incoming cells derived from network data transmissions in a cell memory and for thereafter forwarding each cell from the cell memory, wherein each cell includes data referencing a forwarding resource to receive and forward the cell forwarded from the cell memory, the method comprising the steps of:

a. storing each incoming cell in the cell memory;

b. assigning each cell stored in the cell memory to one of a plurality of flow queues (FQs) such that only cells including data referencing the same forwarding resource are assigned to the same FQ, each flow queue being identified by a separate flow queue identification number (FQ ID);

c. providing a plurality of virtual output queues (VOQs), each associated with a separate forwarding resource;

d. periodically loading each flow queue's FQ ID into the VOQ associated with the forwarding resource referenced by the data included in the cells assigned to that flow queue;

e. periodically removing an FQ ID from each VOQ whenever the VOQ contains at least one FQ; and f. responding to each FQ ID removed from any of the VOQs when the cell memory stores a cell assigned to the FQ ID by forwarding that cell from the cell memory.

10. The method in accordance with claim 9 further comprising the step of;

g. separately adjusting a rate at which the FQ IDs of each FQ are loaded into the VOQs at step d.

11. The method in accordance with claim 9 further comprising the step of:

g. separately adjusting a rate at which FQ IDs are removed from each VOQ containing at least one FQ at step e.

12. The method in accordance with claim 9 further comprising the step of:

g. separately adjusting a rate at which FQ IDs of each FQ are loaded into the VOQs at step d and a rate at which FQ IDs are removed from each VOQ containing at least one FQ at step e.

13. The method in accordance with claim 9 wherein each flow queue has an assigned one of a plurality of priority levels, wherein step d comprises the substeps of:

d1. providing a plurality of sets of virtual port queues (VPQs), wherein each set of VPQs is associated with a separate one of said forwarding resources, and wherein the VPQs of each set is associated with a separate one of the plurality of priority levels;

d2. periodically generating the FQ_ID of each flow queue;

d3. loading each flow queue's FQ ID into one of the VPQs associated with the forwarding resource referenced by the data included in the cells assigned to that flow queue and having associated therewith the flow queue's assigned priority level; and d4. removing FQ ID's from the VPQ's and loading them into the VOQs in an order determined in accordance with the priority levels associated with the VPQs.

14. The method in accordance with claim 13 further comprising the step of;

g. Separately adjusting a rate at which the FQ IDs of each FQ are loaded into the VOQs at step d4.

15. The method in accordance with claim 13 further comprising the step of:

g. Separately adjusting a rate at which FQ IDs are removed from each VOQ containing at least one FQ at step e.

16. The method in accordance with claim 13 further comprising the step of:

g. Separately adjusting a rate at which FQ IDs of each FQ are loaded into the VOQs at step d and a rate at which FQ IDs are removed from each VOQ containing at least one FQ at step e.

17. The method in accordance with claim 10 wherein step g comprises the substeps of:

g1. Separately assigning a forwarding weight to each flow queue; and g2. adjusting the rate at which FQ IDs of each flow queue are loaded into a VOQ at step d as a function of each flow queue's assigned forwarding weight.

18. The method in accordance with claim 17 wherein step g2 is repeated each time a cell is stored in the cell memory at step a.

19. The method in accordance with claim 10 wherein step g comprises the substeps of:

g1. Separately assigning a forwarding weight to each flow queue; and g2. adjusting the rate at which FQ IDs of each flow queue are loaded into a VOQ at step d as a function of each flow queue's assigned forwarding weight relative to a sum of assigned forwarding rates of all flow queues having cells stored in the cell memory.

20. The method in accordance with claim 10 wherein step b comprises the substeps of:

b1. establishing a plurality of flow queues, each identified by a separate FQ ID, and b2. loading a pointer referencing each cell stored in the cell memory into one of the flow queues when the cell is stored in the cell memory at step a; and wherein step f comprises the substeps of:

f1. responding to each FQ ID removed from any of the VOQs by removing a pointer from one of the flow queues identified by the removed FQ ID, and f2. forwarding a cell referenced by the pointer from the cell memory.

* * * * *